United States Patent [19]

Peleg

[11] 4,439,656

[45] Mar. 27, 1984

[54] APPARATUS AND METHOD FOR THE RECONSTITUTION OF FROZEN FOODS IN A MICROWAVE OVEN

[75] Inventor: Yigal Peleg, Solon, Ohio

[73] Assignee: The Stouffer Corporation, Solon, Ohio

[21] Appl. No.: 514,446

[22] Filed: Jul. 18, 1983

Related U.S. Application Data

[63] Continuation of Ser. No. 251,501, Apr. 6, 1981, abandoned.

[51] Int. Cl.³ .............................................. H05B 6/64
[52] U.S. Cl. ...................... 219/10.55 E; 219/10.55 M; 99/451; 99/DIG. 14; 99/413; 426/234; 426/243
[58] Field of Search ................ 219/10.55 E, 10.55 M, 219/10.55 F, 10.55 R; 426/241, 243; 99/451, DIG. 14, 410–418; 220/23.83

[56] References Cited

U.S. PATENT DOCUMENTS

| | | | |
|---|---|---|---|
| 2,997,566 | 8/1961 | Pierce et al. | 219/10.55 E |
| 3,731,037 | 5/1973 | Levinson | 219/10.55 E |
| 3,745,290 | 7/1973 | Harnden, Jr. et al. | 219/10.49 R |
| 3,753,651 | 8/1973 | Boucher | 219/10.55 X |
| 3,854,023 | 12/1974 | Levinson | 219/10.55 E |
| 3,985,990 | 10/1976 | Levinson | 219/10.55 E |
| 4,013,798 | 3/1977 | Goltsos | 426/107 |
| 4,091,119 | 5/1978 | Bach | 426/234 |
| 4,178,494 | 12/1979 | Bottalico et al. | 219/10.55 R |
| 4,262,183 | 4/1981 | Smith et al. | 219/10.55 E X |
| 4,280,032 | 7/1981 | Levinson | 219/10.55 E |
| 4,306,133 | 12/1981 | Levinson | 219/10.55 F X |
| 4,317,017 | 2/1982 | Bowen | 219/10.55 E |

FOREIGN PATENT DOCUMENTS

| | | |
|---|---|---|
| 2526196 | 12/1976 | Fed. Rep. of Germany . |
| WO80/01483 | 7/1980 | PCT Int'l Appl. ...... 219/10.55 E X |
| 622013 | 4/1949 | United Kingdom . |

*Primary Examiner*—B. A. Reynolds
*Assistant Examiner*—Philip H. Leung
*Attorney, Agent, or Firm*—Body, Vickers & Daniels

[57] ABSTRACT

Apparatus and method enabling the heating or reconstituting of frozen foods packaged in a metal container using a microwave oven. The metal container is placed in a non-metallic holder having a cavity just slightly larger than the outside dimensions of the container. The spacing between the outside of the container and the inside surface of the holder is a uniform small distance. The resultant space is filled with a liquid which absorbs microwave energy, converting it to thermal energy which is then transmitted through the container to the food to be reconstituted.

8 Claims, 3 Drawing Figures

APPARATUS AND METHOD FOR THE RECONSTITUTION OF FROZEN FOODS IN A MICROWAVE OVEN

This is a continuation of application Ser. No. 251,501 filed Apr. 6, 1981, now abandoned.

BACKGROUND OF THE INVENTION

This invention pertains to the art of microwave electrical heating and, more particularly, to an apparatus and a method for using microwave energy to heat frozen goods packaged in a metallic container.

Frozen foods, particularly frozen prepared convenience foods, form a significant portion of the groceries bought by many people. In the past and presently, many of these frozen foods have been marketed in aluminum containers or other microwave opaque structures. These aluminum containers or trays provide excellent shipping containers, freezing containers and cooking containers for use in conventional ovens. These and other desirable features of aluminum trays, including economy, have made them the overwhelming favorite among food processors as containers for processed foods sold to consumers.

The reconstitution of frozen prepared foods requires raising the temperature throughout the food generally to about 180° F. Raising the temperature of portions of the food above 180° F. wastes heat and can damage the food item by drying it out. Some over-heating of food portions is normally required in reconstituting frozen foods in order that heat will be conducted from hot outer portions to cooler inner portions. However, excessive overheating is damaging and wasteful.

Present microwave ovens normally consist of an enclosed cooking area which will contain microwave energy thereby protecting the consumer. Microwave energy is generated in the 915 megahertz or 2,450 megahertz bands by a magnetron and introduced into the microwave containing area. The microwave energy penetrates food substances and is normally absorbed within about one inch of the surface of most foods. The absorbed energy heats the food and this heat is transferred to other portions of the food by conduction to heat the entire food item.

Metallic containers, such as the metallic trays presently used with frozen prepared foods, present significant problems when used in microwave ovens. Metallic containers are opaque to microwaves. Therefore, foods contained within a metallic container can only be heated through surfaces which are not covered by the metal, normally the top only, and not through the remaining surfaces of the food item. This results in uneven heating, with some portions being dried out or overcooked and other portions remaining cold or unreconstituted.

Metallic surfaces in microwave ovens also result in "arcing" which can damage the metallic surface on which the arcing occurs and adjacent surfaces such as the food item. Arcing can also damage the microwave oven itself. Heretofore, microwave oven manufacturers have recommended that metallic substances or surfaces not be introduced into microwave ovens except in very specifically defined instances because of these and other problems.

Various structures have been proposed for heating food in a microwave oven using metallic trays as part of a container. U.S. Pat. No. 4,013,798 to Goltos describes a plastic tray containing food which is placed inside a metallic shield allowing one to heat different types of food at different rates at the same time. U.S. Pat. No. 3,731,037; No. 3,854,023; and No. 3,985,990 all to Levinson describe various complex structures including microwave absorptive material which is heated in a microwave oven. The heat generated in the microwave absorptive material is contained within the structure and used to heat the contained food. None of these structures will heat food contained in a metallic tray evenly through all surfaces.

Other methods of heating using microwave ovens are described in U.S. Pat. No. 3,753,651; No. 4,091,119; No. 4,178,494 and German Pat. No. 2,526,196. U.S. Pat. No. 3,745,290 and British Pat. No. 622,013 describe electric means other than microwaves for heating food.

The present invention contemplates a new and improved apparatus and method for heating food filled metallic trays in a microwave oven and heating the food contained in the tray from all surfaces which overcomes the above referred to problems and others and enables food processors to package frozen prepared food in a container usable in all of the major cooking techniques.

THE INVENTION

In accordance with the invention means are provided for holding a thin layer of microwave absorptive liquid in heat conductive contact with the bottom and at least a portion of the sides of a metallic tray or pan containing frozen food.

Further, in accordance with the present invention, there is provided for use with a metallic tray container for frozen foods, a non-metallic tray holder having a cavity shaped to receive with a small clearance the metallic tray, the clearance being filled with a liquid which will absorb the microwave energy, generating heat which transfers to the surface of the tray and thus to the frozen food.

Further in accordance with the present invention, there is provided for use with a frozen food containing tray fabricated from thin metal having a predetermined exterior configuration, a tray holder fabricated from a microwave transparent material having a bottom wall and side walls defining an interior cavity closely following the configuration of the tray, and, spacer means positioning the tray within the tray holder cavity such that a space between one-sixteenth and five-sixteenth inch exists between the bottom wall of the cavity and the bottom wall of the tray and the side walls of the cavity and at least the bottom half of the side walls of the tray.

Further in accordance with the invention, there is provided an enlarged space between the side walls of the cavity and the side walls of the tray above the midway point of the tray side walls providing room for expansion of heat transfer liquid and to compensate for over-filling.

Further in accordance with the present invention, there is provided a cover for the tray holder closing the cavity but allowing the passage of steam.

Yet further in accordance with the invention a tray holder is provided with a double wall construction providing thermally insulating spaces around the sides of and underneath the tray holder cavity.

Further in accordance with the invention, a method of reconstituting frozen foods in metallic trays is provided comprising the steps of: providing a tray holder having a cavity with given dimensions slightly larger than the dimensions of the metallic tray, placing a microwave absorptive liquid in the cavity, providing spacer means adapted to maintain said tray spaced a given distance from the tray holder cavity, placing the tray in the cavity such that the liquid fills the space between the tray bottom and tray holder cavity bottom, and at least the lower half of the tray sides and tray holder cavity sides, covering the tray holder and irradiating the entire structure with microwave energy.

OBJECTS

The principal object of the present invention is to provide an apparatus which will allow the reconstitution in a microwave oven of frozen prepared foods contained in metallic trays.

A further object of the present invention is to provide for the reconstitution of frozen prepared foods in a microwave oven wherein the food product will be heated uniformly throughout its body.

Another object of the present invention is to provide means for surrounding a metallic tray containing frozen food with a thin layer of microwave absorptive liquid such that the frozen food may be reconstituted in a microwave oven.

Yet another object of the present invention is the provision of a tray holder allowing the reconstitution of frozen prepared foods in a microwave oven using water or a similar liquid as an energy absorbing agent to convert microwave energy into heat energy which can then be transferred through the metallic tray to the food.

DRAWINGS

The invention may take physical form in a number of different embodiments, preferred embodiments of which will hereinafter be described in detail and illustrated in the accompanying drawings which form a part hereof and wherein.

PREFERRED EMBODIMENT

Figure 1:
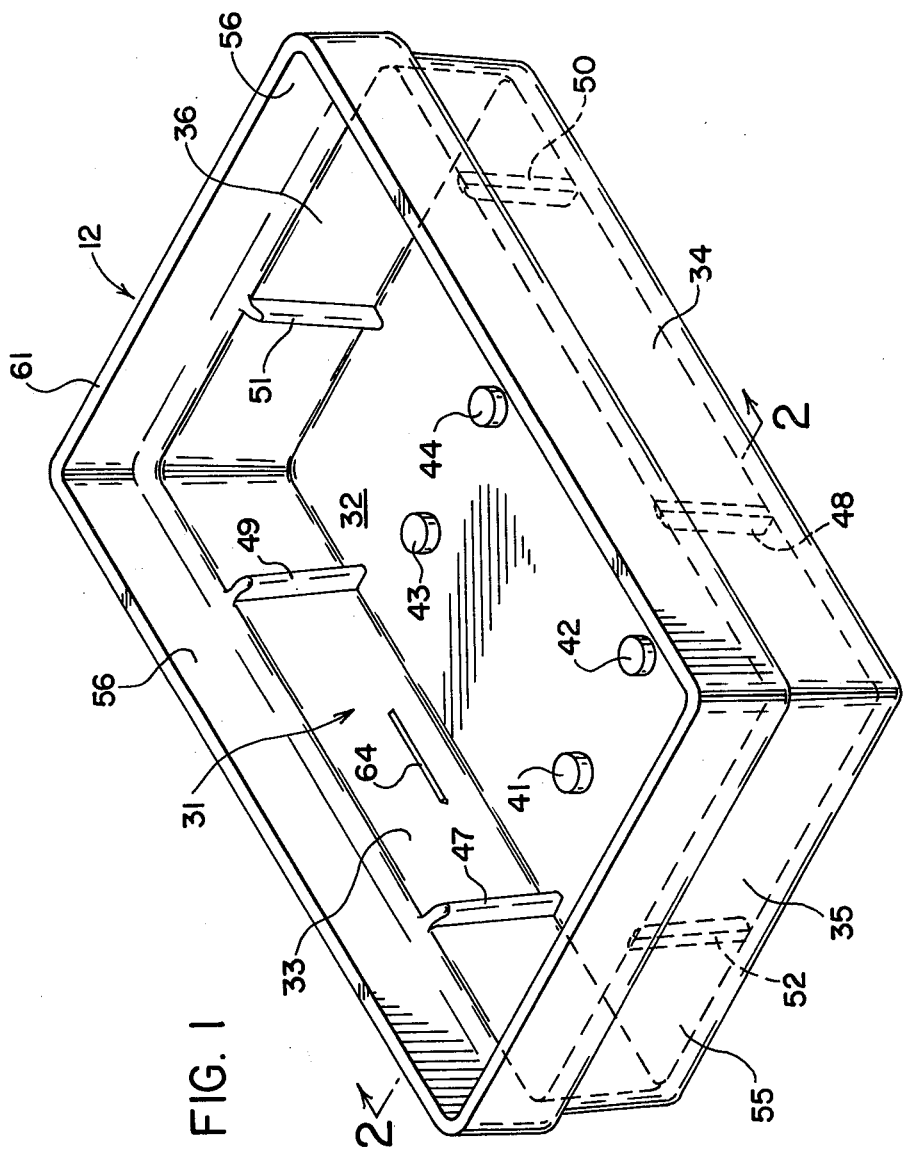
FIG. 1 is a perspective view of the tray holder of the present invention.
Figure 2:
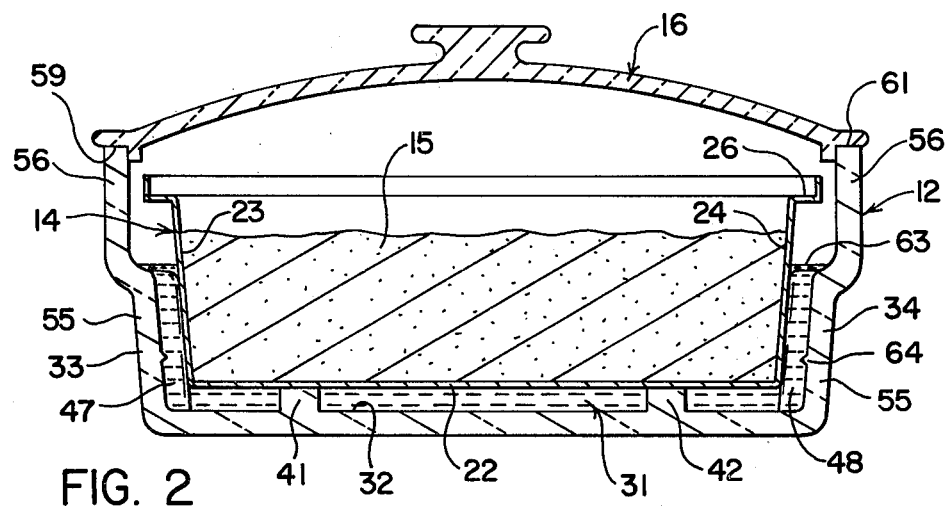
FIG. 2 is a cross-sectional view taken along the line 2—2 of FIG. 1 illustrating the tray holder shown in FIG. 1 with a tray and the tray holder top in place as they would be arranged for cooking in a microwave oven; and, FIG. 3 is a cross-sectional view of a second embodiment of a tray holder used in the present invention similar to FIG. 2.

Referring now to the drawings wherein the showings are for the purpose of illustrating a preferred embodiment of the invention and not for the purpose of limiting same, FIGS. 1 and 2 show a tray holder 12, a tray 14 containing a frozen prepared food product 15 disposed within the tray holder and a cover or top 16 closing the top opening of the tray holder 12.

Tray 14 is conventional in the frozen food industry and has a bottom 22 and four side walls, only two of which 23, 24 are visible in cross section in FIG. 2. Tray 14 is normally provided with a lip 26 around the top of the side walls which will engage a paper shipping cover (not shown) which may be removed before cooking. Tray 14 is fabricated from thin gauge aluminum sheet or similar metallic sheet. The tray itself is usable as a cooking container in conventional ovens and convection ovens. The aluminum tray can easily withstand the heat encountered in these types of cooking and the aluminum is an excellent heat conductor allowing the even penetration of heat from an oven or convection oven to the food from all sides.

Trayholder 12 has a central cavity 31 defined by a bottom wall 32 and four side walls 33, 34, 35, 36. In accordance with the invention means are provided for spacing the outer surfaces of tray 14 from the inner surfaces of tray holder 12. Such means may take a number of different forms such as corrugations or projections on the walls of tray 14, but in the preferred embodiment comprise bottom spacers 41, 42, 43, 44 arranged on bottom wall 32. Side wall spacers 47, 48, 49, 50, 51, 52 are arranged on the four side walls 33, 34, 35, 36. The side walls are divided into lower portions 55 and upper portions 56. The upper portions 56 are recessed in relation to the lower portions 55. All of the side wall spacers are disposed on lower portions 55.

Cover or top 16 is provided with a downwardly facing surface 59 which will rest upon uppermost surface 61 of the trayholder side walls 33, 34, 35, 36.

Tray holder 12 and cover 16 must be fabricated from a microwave transparent material such as paper, plastic, pottery, foamed ceramic, or, preferably glass or stoneware.

In utilizing the present invention, a liquid 63 is placed in tray holder 12 up to fill line 64 in cavity 31. Liquid 63 can be simple tap water, a salt water brine, a sugar solution or any other liquid which will absorb microwave energy and is safe for use with food. Liquid 63 may be put in either hot or cold but is preferably preheated. The metallic tray 14 is then placed in tray holder central cavity 31, and spaced from bottom wall 32 and side walls 33, 34, 35, 36 by bottom spacers 41, 42, 43, 44 and side wall spacers 47, 48, 49, 50, 51, 52. The dimensions of cavity 31 and the size of the spacers are selected such that a uniform space is provided under tray bottom 22 and around all sides of the tray at least half way up the tray sides. This uniform space is between one sixteenth inch and five sixteenths inch and preferably between one eighth inch and one quarter inch.

Liquid 63 is displaced by tray 14 filling the space between the tray bottom 22 and the tray holder bottom 32 and the tray side walls 23, 24 and the lower portions 55 of the tray holder side walls 33, 34, 35, 36. Any excess liquid due to overfilling or thermal expansion is contained in the volume defined by side wall upper portions 56 and the tray side walls 23, 24. Preferably side wall lower portion 55 is two-thirds the height of tray sidewalls 23, 24. The microwave transparent cover or top 16 is then put in place and the assembly placed in a microwave oven. The aluminum tray containing frozen food is thus surrounded to two thirds its height with a microwave absorptive liquid layer.

The entire structure is then irradiated with microwaves resulting in heating of the food 15 through two mechanisms. The first mechanism is direct microwave irradiation of the top surfaces of the food item. As microwaves will penetrate into the food, the top half inch to inch of food 15 will be directly heated. The microwave transparent cover 16 is not heated by the microwave energy and does not interfere with the microwave heating of food 15. The second mechanism is microwave heating of the microwave absorptive liquid 63. As heat is added to the liquid, it is conducted through the aluminum tray 14 to the food product. The aluminum tray 14 itself is a very good heat transfer medium and withdraws energy from the liquid through heat transfer as rapidly as microwaves add heat to the liquid. Any slight excess heat added by the microwave energy will raise the temperature of the liquid 63, increasing the temperature gradient through the aluminum tray and raising the heat transfer rate. If more heat is added to the liquid 63 than can be transferred to the food 15, the liquid will eventually boil thus limiting the maximum temperature to 212° F. when liquid 63 is water. The preferred heat transfer liquid, water, will produce harmless steam. Steam, however, is not normally generated in more than negligible quantities unless overcooking is inadvertently performed by the user. The presence of hot water within the container maintains high humidity in the container without boiling enhancing cooking characteristics.

It has been found that because so much of the microwave energy is absorbed by the liquid and the environment of the aluminum tray is kept humid, that the problems of arcing heretofore experienced are eliminated.

The spacing between tray 14 and tray holder cavity 31 is selected to optimize heat absorption by and transfer from liquid 63. The volume and mass of liquid 63 determines the amount of microwave energy absorbed. The area of contact between tray 14 and liquid 63 determines the rate of heat transfer to tray 14. The thickness of liquid 63 surrounding the tray 14 determines the relationship or ratio of liquid mass to transfer area and, therefore, is very important in determining the efficiency of transfer of the energy absorbed in the liquid through the tray 14 to food 15. A thicker layer of liquid would result in more heat being absorbed and retained in the liquid than could be transferred and therefore wasted. A thinner layer of liquid would not absorb sufficient microwave energy to rapidly heat the food product.

The spacing between the tray 14 and tray holder cavity 13 can be maintained by the projections shown or by similar projections on tray 14. Further, spacers can be continuous ribs in cavity 31 or on tray 14. Continuous ribs would provide channeling for liquid 63 where modification of heat transfer through liquid convection is desired.

Figure 3:
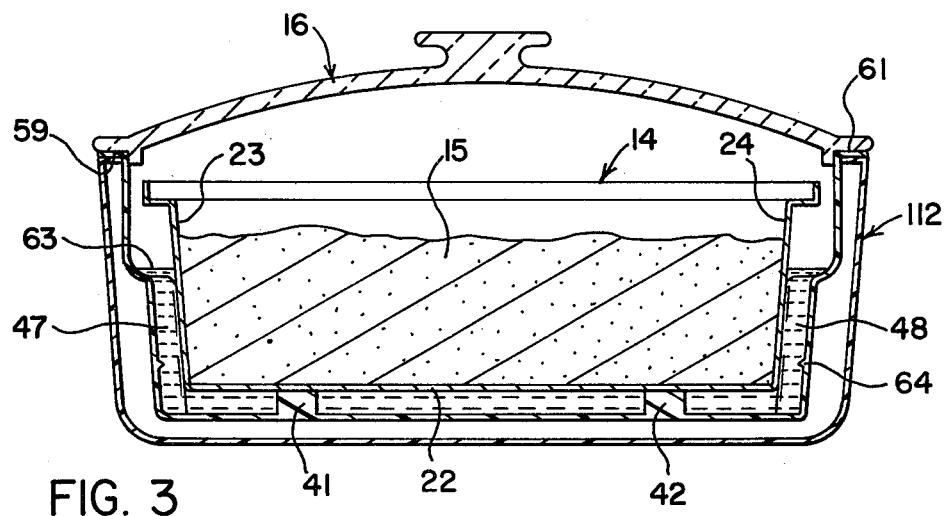

An additional refinement in tray holder construction is the use of a double wall trayholder 112 as shown in FIG. 3. This minimizes the mass of the tray holder, thereby minimizing the microwave energy absorption in the tray holder and insulating the exterior of the tray holder from the heat generated in the liquid contained in the cavity 31, like parts in tray holder 112 and tray holder 12 are given like reference numbers.

An insert for available ceramic utility dishes such as those currently marketed under the trademark CORNINGWARE can also be used to practice the invention. The frozen food containing metallic tray is sized to fit into the utility dish with space left under the tray and around tray sides as previously discussed. The spacing is provided by an insert comprised of inter connected spacer elements. The insert is sized to fit in a particular size utility dish and accommodate a particular size tray. Alternatively spacers, such as protruding ribs or the like, could be provided directly on the food container metallic tray such that proper spacing will be maintained from the sidewalls and bottom of a selected utility dish. An appropriate liquid layer surrounding the tray is thus provided.

Having thus described my invention, I claim:

1. In a microwave oven, an apparatus for the reconstitution of frozen foods, such foods being contained in a metallic tray having a bottom wall and continuous side walls of a given height, comprising:
 a tray holder of microwave transparent material having a bottom wall and side walls defining a cavity similar in shape to said tray;
 spacer means for supporting said tray in said tray holder cavity such that said tray bottom is uniformly spaced from said tray holder rigid bottom wall a distance between one-sixteenth inch and five-sixteenth inch and said tray side walls are spaced from said tray holder side walls throughout said given height and are uniformly spaced from said tray holder side walls a distance between one-sixteenth inch and five sixteenth inch for at least half said tray side walls given height, said tray holder side walls extending above said tray side walls, the space between said tray and said cavity being filled with a microwave absorbing liquid to at least half said tray side walls given height and;
 a cover engaging the tops of said tray holder side walls, whereby the space above said tray is in communication with said space between said tray and said cavity.

2. The apparatus of claim 1, wherein said tray holder side walls are provided with a recessed area in their top halves.

3. The apparatus of claim 2, wherein said tray holder side walls are provided with a recessed area in their top thirds.

4. The apparatus of claim 1, wherein said spacing distances are between one-eighth inch and one-quarter inch.

5. The apparatus of claim 1, wherein said tray holder is provided with outer side walls spaced from said tray holder side walls to provide an insulating air space, thermally insulating said tray holder cavity from the exterior surfaces of said tray holder.

6. The apparatus of claim 5, wherein said tray holder is provided with a lower bottom wall spaced from said tray holder rigid bottom wall and providing an air space between said tray holder rigid bottom wall and said tray holder lower bottom wall thermally insulating said tray holder lower bottom wall from said tray holer cavity.

7. A method for reconstituting frozen food contained in a metallic tray having a bottom and continuous side walls with given dimensions in a microwave oven comprising the steps of:
 providing a microwave transparent tray holder having a cavity defined by a bottom wall and side walls, said cavity having dimensions similar to the exterior dimension of said tray and said cavity side walls having a height greater than the height of said tray side walls, and spacer means adapted to support said metallic tray in fixed relation to said cavity with said metallic tray bottom spaced between one-sixteenth inch and five-sixteenth inch from said cavity bottom wall, with said metallic tray sides spaced from said cavity side walls throughout the given height of said tray sides, and with said metallic tray sides spaced between one-sixteenth inch and five-sixteenth inch from said cavity side walls for at least one-half said given height of said metallic tray sides;
 placing a microwave absorbing liquid in said cavity;
 placing said metallic tray containing frozen food in said cavity such that said metallic tray engages said spacer means and displaces said microwave absorbing liquid into the space between said cavity and said metallic tray to at least one-half said given height of said metallic tray sides;
covering said tray holder to provide a space above said tray in communication with the space between said tray and said cavity; and
irradiating said tray holder, tray and said food with microwave energy thereby reconstituting said frozen food.

8. The method of claim 7, including the additional step of preheating said microwave absorbing liquid before adding said tray containing said frozen food.

* * * * *